US008417062B2

(12) United States Patent
Price et al.

(10) Patent No.: US 8,417,062 B2
(45) Date of Patent: Apr. 9, 2013

(54) SYSTEM AND METHOD FOR STABILIZATION OF FISHEYE VIDEO IMAGERY

(75) Inventors: Jeffery R. Price, Knoxville, TN (US); Timothy F. Gee, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 784 days.

(21) Appl. No.: 12/581,484

(22) Filed: Oct. 19, 2009

(65) Prior Publication Data
US 2011/0091131 A1 Apr. 21, 2011

(51) Int. Cl.
*G06K 9/32* (2006.01)
*H04N 7/18* (2006.01)

(52) U.S. Cl.
USPC .......................................... 382/294; 348/149

(58) Field of Classification Search .................. 382/294, 382/276, 287, 293, 302; 348/143, 144, 149, 348/169
See application file for complete search history.

(56) References Cited

U.S. PATENT DOCUMENTS

| 6,097,854 | A | * | 8/2000 | Szeliski et al. | 382/284 |
| 6,493,031 | B1 | * | 12/2002 | Washizawa | 348/335 |
| 2008/0058593 | A1 | * | 3/2008 | Gu et al. | 600/109 |

OTHER PUBLICATIONS

Price et al., Stabilizing Fisheye Video From a Light-Mounted Camera, 15th World Congress on Intelligent Transport Systems and Its America's 2008 Annual Meeting, New York, NY, Nov. 16-18, 2008.
Potucek, Automatic Image Stabilization for Omni-directional systems, Proceedings of the Fifth IASTED International Conference on Visualization, Imaging,and Image Processing, 2005, pp. 338-342.
Shi et al., Good Features to Track, IEEE Conference on Computer Vision and Pattern Recognition, CVPR94, Jun. 1994, Seattle.

* cited by examiner

*Primary Examiner* — Yon Couso
(74) *Attorney, Agent, or Firm* — Scully, Scott, Murphy & Presser, P.C.

(57) ABSTRACT

A coordinate system mapping between each image and the reference image of fisheye images are computed and used to resample each image to align with the reference image directly in the fisheye image space.

31 Claims, 3 Drawing Sheets

SYSTEM AND METHOD FOR STABILIZATION OF FISHEYE VIDEO IMAGERY

FIELD OF THE INVENTION

The present disclosure relates to computer vision and image processing, and more particularly to stabilizing fisheye video imagery.

BACKGROUND OF THE INVENTION

The use of automated vision systems in traffic surveillance and monitoring applications has increased drastically over the last several years. Such applications include traffic flow monitoring, vehicle counting, and queue detection and intersection management. While there are cameras for surveillance or the like fixed on a stationary medium such as a fixed pole on the road for taking pictures or images of moving scenes, e.g., vehicles, pedestrians, and other motions, the cameras may be also mounted on a medium that could be moving, for example, a traffic light that is hung by a cable and that could swing, for instance, due to wind, other weather conditions, or any other condition that would cause the traffic light to move. If the cameras are installed on such moving mediums, the images taken from frame to frame need to be compensated for the motion of the camera. That is, the image recognition or computer vision techniques or the like need to be able to distinguish the moving objects in the scene from the object displacements occurring from frame to frame due to the moving camera. Therefore, it is desirable to have a technique for accounting for this motion.

BRIEF SUMMARY OF THE INVENTION

A method and system for stabilizing fisheye video imagery are provided. The method, in one aspect, may include selecting a reference image from a series of fisheye video imagery and selecting a plurality of landmark points in the reference image. The method may also include tracking the plurality of landmark points in a new image from the series of fisheye video imagery. The method may further include computing a coordinate system mapping between the new image and the reference image using the tracked landmark points, and resampling the new image to align with the reference image.

The step of computing, in one aspect, may include transforming fisheye image coordinates of the reference image to a reference world space coordinates using an understanding of a camera lens; transforming the tracked landmark points in the new image to a new image world space coordinates using the understanding of the camera lens; and analyzing the plurality of landmark points in the reference world space coordinates and the tracked landmark points in the new image world space coordinates in pairs to define homography between a plane in reference world space and a plane in new image world space, the plurality of landmark points including four or more landmark points.

The step of computing, in one aspect, may further include transforming pixel coordinates in the reference world space to the new image world space using the homography; and transforming the transformed pixel coordinates to the fisheye image coordinates of the new image.

The step of resampling, in one aspect, may include copying data closest to the transformed pixel coordinates in the fisheye image coordinates of the new image to corresponding reference pixel coordinates in the fisheye image coordinates of the reference image.

A method of stabilizing fisheye video imagery, in another aspect, may include scanning a reference fisheye image to obtain a pixel coordinate location (u, v) and selecting a new fisheye image. The method may also include transforming the reference fisheye image coordinate location (u, v) to reference image's world space coordinate (x, y) and transforming the reference image's world space coordinate (x, y) to new image's world space coordinate ($\hat{x}$, $\hat{y}$). The method may further include transforming the new image's world space coordinates ($\hat{x}$, $\hat{y}$) to new image's fisheye space coordinate ($\hat{u}$, $\hat{v}$) and mapping new image data found closest to the new image's fisheye space coordinate ($\hat{u}$, $\hat{v}$) to the reference fisheye image coordinate location (u, v). Yet in another aspect, the steps may be performed for each pixel in the reference fisheye image and a new fisheye image.

The step of transforming the reference image's world space coordinate (x, y) to new image's world space coordinate ($\hat{x}$, $\hat{y}$) in one aspect, may be performed using homography computed from tracked points in the reference fisheye image and the new fisheye image.

A system for stabilizing fisheye video imagery, in one aspect, may include a processor and a module executable on the module. The module may be operable to scan a reference fisheye image to obtain a pixel coordinate location (u, v). The module may be further operable to select a new fisheye image. The module may be further operable to transform the reference fisheye image coordinate location (u, v) to reference image's world space coordinate (x, y) and further operable to transform the reference image's world space coordinate (x, y) to new image's world space coordinate ($\hat{x}$, $\hat{y}$). The module may be yet further operable to transform the new image's world space coordinates ($\hat{x}$, $\hat{y}$) to new image's fisheye space coordinate ($\hat{u}$, $\hat{v}$) and map data found closest to the new image's fisheye space coordinate ($\hat{u}$, $\hat{v}$) to the reference fisheye image coordinate location (u, v).

A system for stabilizing fisheye video imagery, in another aspect, may include a processor and a module operable to execute on the processor. The module may be further operable to select a reference image and select a plurality of landmark points in the reference image. The module may be also operable to track the plurality of landmark points to a new image and compute a coordinate system mapping between the new image and the reference image using the tracked landmark points. The module may be further operable to resample the new image to align with the reference image.

A program storage device readable by a machine, tangibly embodying a program of instructions executable by the machine to perform one or more methods described herein may also be provided. Still yet, a computer readable storage medium storing a program of instructions executable by a machine to perform one or more methods described herein may be provided.

Further features as well as the structure and operation of various embodiments are described in detail below with reference to the accompanying drawings. In the drawings, like reference numbers indicate identical or functionally similar elements.

DETAILED DESCRIPTION

Figure 2:
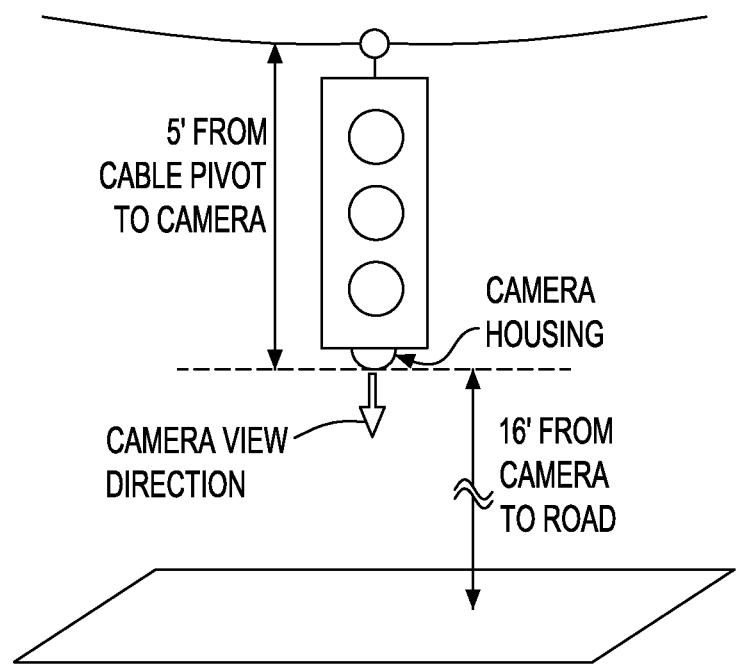
FIG. 2 shows an example of a test configuration.

A single, large-angle fisheye camera mounted underneath an otherwise standard traffic light takes pictures of the area. FIG. 2 shows an example of a test configuration. The traffic light is not rigidly mounted but instead hung from cables as shown. In these scenarios, the traffic light, and hence the camera, tends to swing in the wind or by other forces. This movement of the camera causes stationary structures to apparently move in the acquired video or sequence of pictures. To make use of the video for higher level computer vision tasks—vehicle detection and tracking, for example—the system and method of the present disclosure correct the scene motion imparted by the moving camera, i.e., stabilize the images.

Figure 1:
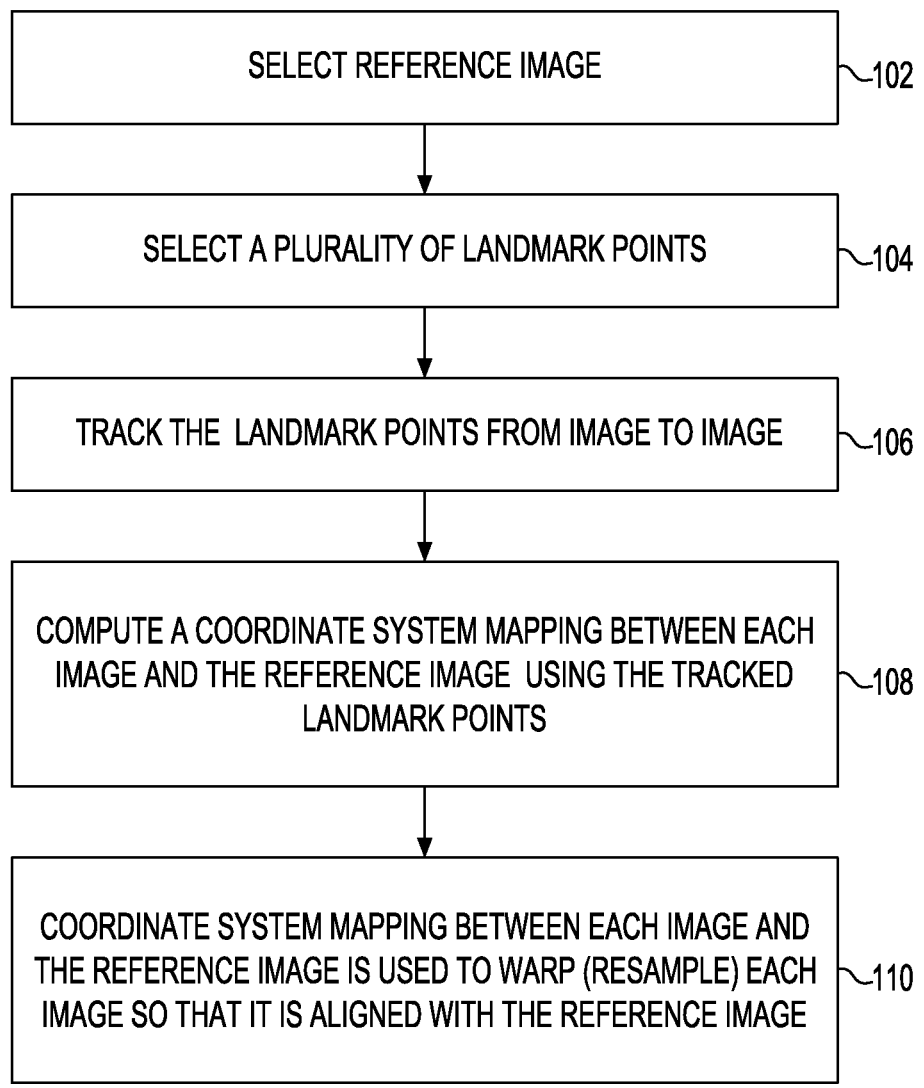
FIG. 1 is a flow diagram illustrating a method in one embodiment of stabilizing the image.

FIG. 1 is a flow diagram illustrating a method in one embodiment of stabilizing the image. At 102, a reference image is selected. A reference image may be an initial image from the frame of images or any other image to which other images can be mapped or aligned.

At 104, a plurality of landmark points in the reference image are selected and labeled. Preferably, four or more landmark points are selected. The following description explains in one embodiment how salient image points on stationary structures in the reference image are tracked through the video using the Lucas-Kanade algorithm. Briefly, Lucas-Kanade method is optical flow estimation method. The system and method of the present disclosure in one embodiment make use of landmark points in the scene to understand and characterize the camera movement. For these landmarks, the system and method of the present disclosure may select naturally occurring background points on fixed structures with image edge information. Some examples of such landmark points might include the corners of road signs or intersecting lines on the road surface. Ideally, points that are not frequently affected by vehicle movement may be selected for videos of road with moving vehicles. The landmark points may be selected manually, and for example, may be input as one or more parameters to the algorithm of the present disclosure. In another embodiment, the landmark points many be selected using an automated method that detects and maintains landmark points. One example of such methodology is described by Jianbo Shi and Carlo Tomasi, Good features to track, IEEE International Conference on Computer Vision and Pattern Recognition, 1994.

At 106, the landmark points are then tracked from image-to-image, for instance, taken from the camera as it swings. In one embodiment, the tracking may be performed the Lucas-Kanade algorithm. Other algorithms may be used. In one embodiment of the present disclosure, landmark points are tracked forward through sequential frames using the Lucas-Kanade method, which is briefly described herein. The point tracking finds pixel displacements δx and δy that reduce the error in registered image intensities, E(·), as defined by:

$$E(x,y,t,t+\delta) = [I(x+\delta x, y+\delta y, t+\delta t) - I(x,y,t)]^2 \quad \text{(Eq. 1)}$$

where I is a sequence of two-dimensional image frames indexed by spatial dimensions x and y and time dimension t. Optical flow techniques, which include the Lucas-Kanade method, model intensity changes by their total derivative. By taking the Taylor expansion around a point in the image sequence, and setting the higher order terms to zero, we obtain $$I(x+\delta x, y+\delta y, t+\delta t) = I(x, y, t) + \frac{\delta I}{\delta x}\delta x + \frac{\delta I}{\delta x}\delta y + \frac{\delta I}{\delta t}\delta t. \quad \text{(Eq. 2)}$$

By assuming that intensity is constant along its traveled path, the displaced intensities can be set equal to one another to obtain the optical flow equation $$0 = \frac{\delta I}{\delta x}v_x + \frac{\delta I}{\delta x}v_y + \frac{\delta I}{\delta t}, \text{ where, } v_x = \frac{\delta x}{\delta t} \text{ and } v_y = \frac{\delta y}{\delta t}, \quad \text{(Eq. 3)}$$

which are the displacements normalized to time.

The optical flow equation, however, cannot be solved for an individual point as there are two unknowns and only one equation; this is commonly known as the "aperture problem" of optical flow. The Lucas-Kanade algorithm solves the equation by examining a neighborhood around each desired displacement vector to thereby define multiple equations and resulting in a least-squares solution. In short, the Lucas-Kanade algorithm strives to match a region around each pixel of interest. However, since the method relies on local gradient information, it can become less reliable for large pixel displacements. This issue is usually addressed by solving the least square problem iteratively, warping I between iterations to successively increase accuracy in the solution. Additionally, the iterative search can be performed in a coarse-to-fine fashion, beginning with lower image resolutions.

The tracked points as described above are used to align each acquired fisheye image to the coordinate system of the reference fisheye image. That is, in one embodiment of the present disclosure, the tracked points are used to compute the transformation between the current image and the reference image. This transformation is then used to compute a representation of the current fisheye image in the coordinate system of the reference fisheye image. Thus, at 108, using a simplifying planar world assumption, the tracks of these landmark points are used to compute a coordinate system mapping between each image and the reference image directly in the fisheye image space.

At 110, this coordinate system mapping between each image and the reference image is used to warp (resample) each image so that it is aligned with the reference image. The method and system of the present disclosure work directly in the fisheye image space. Working directly in the fisheye image space removes the computational complexity of fisheye-to-perspective transformation and also ensures that the image pixels are used at their native resolution.

The following notations used in the description described here. Let $_pI^q(u, v)$ represent image q in the coordinate system of image p, where (u, v) represents a pixel location in the digital image. The image stabilization task is to compute $_rI^n(u, v)$, which is the image at time n in the coordinate system of the reference image indicated by r. The observed image at time n is represented by $_nI^n(u, v)$, which is image n in coordinate system n.

Figure 3:
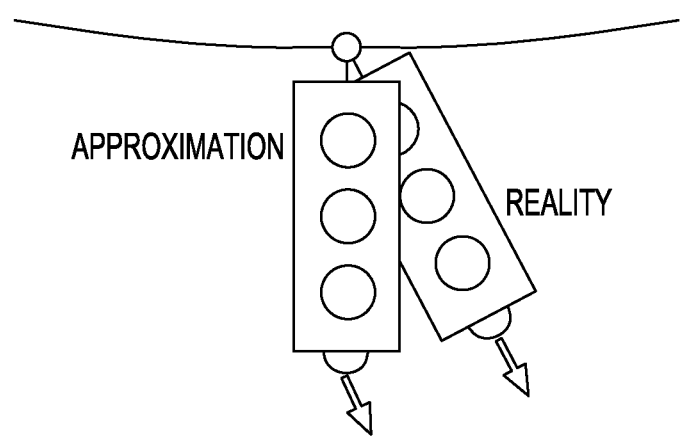
FIG. 3 illustrates swinging camera approximation.

In one embodiment of the present disclosure, the swinging camera or the like is approximated by a pure rotation. Under pure rotation, scene points in different (perspective) images are related by a plane projective transformation, also known as a homography. In general, the three dimensional (3D) motion of the camera imparts a non-trivial perspective distortion between each image frame and the reference. Under pure camera rotation, however, all of the scene points, even though they are 3D, can be considered to lie on a plane, which in this disclosure is referred to as the world plane. The mapping between two such views can be exactly represented by a plane projective transformation or homography. The homography matrix may be computed between each frame and the reference frame. This transform can be computed from four or more point correspondences. This transformation may be used along with the known camera model, to compute a representation of each image in the coordinate system of the reference image. As illustrated in FIG. 3, the system and method of the present disclosure in one embodiment approximate the camera motion as pure rotation. This is equivalent to considering the camera to be stationary and the world plane to be transformed.

Figure 4:
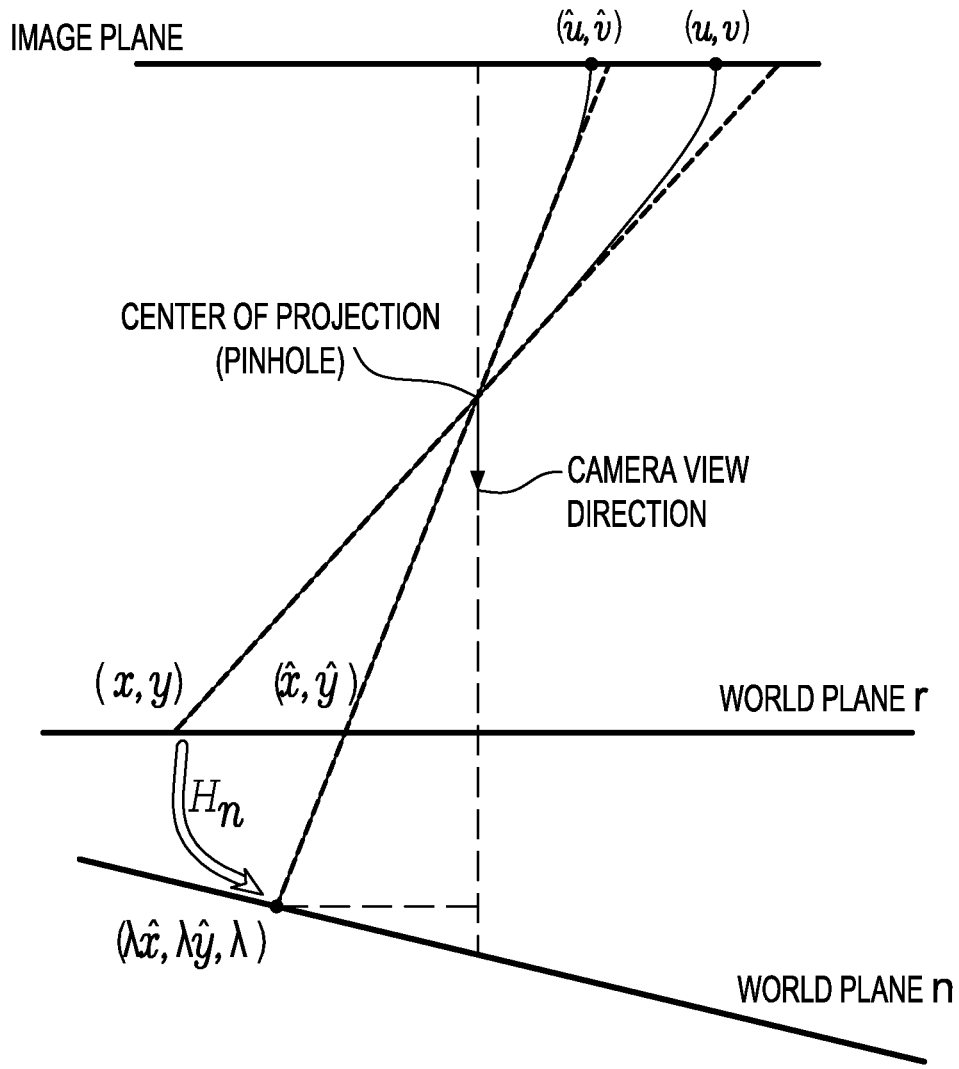
FIG. 4 illustrates a mapping process that computes image n in the coordinate system of the reference image r in one embodiment of the present disclosure.

Referring to FIG. 4, we begin in the image plane with a pixel (u, v) in the reference fisheye coordinate system. This pixel is mapped to the world plane as point (x, y) according to the known camera model. The straight, dashed lines towards the points (u, v) and (û, v̂) represent perspective projection; the solid, curved lines to the points represent the equidistant fisheye lens projection.

Point (x, y) is then transformed in homogeneous coordinates by the 3×3 homography matrix $H_n$ (for image frame n) to the point $(\lambda \hat{x}, \lambda \hat{y}, \lambda)$, which corresponds to $(\hat{x}, \hat{y})$ on the reference world plane, Applying the camera model again, we can then project the transformed point $(\hat{x}, \hat{y})$ back to the image plane to find (û, v̂) in coordinate system n. To compute image n in the reference coordinate system, we use $$_r I^n(u,v) =\ _n I^n(\hat{u},\hat{v}) \quad (Eq.\ 4)$$

for all (u, v). With a known camera model, the only unknown in this process is the homography matrix $H_n$. This matrix is given by the mapping that takes the landmark points in the world plane coordinates of the reference frame, $(x_l, y_l)$, to their corresponding world plane coordinates.

In one aspect, the steps 102 to 108 may be considered estimation steps in which parameters needed in stabilizing the images are computed. Step 110 may be considered as "warping" stage in which a new image registers with the reference image in the coordinate system of the reference image to stabilize the images.

In the following description, the notion of a "world space" is used. This is a flattening of what is seen in the fisheye image. The world space refers to the coordinate system of a perfect plane that is perpendicular the camera's optical axis. For instance, as shown in FIG. 2, if the camera's view is straight down at a floor, the floor could be the world space. However, in the system and method of the present disclosure, while the coordinates of the fisheye image are transformed to the world space, fisheye camera image data is not transformed to the world space, and a flattened image is not created. Rather, the coordinates are transformed for mapping of the pixel coordinates in the fisheye image and world space image.

As described above, the estimations steps may include defining landmark points in the reference image, for instance, as described above with reference to step 104 in FIG. 1. The fisheye image coordinates (e.g., pixel location) are transformed to a world space coordinates using an understanding of the camera lens, for instance, as in step 108 of FIG. 1. In the fisheye image space, the defined landmark points are tracked through time, for instance, up to the new image (e.g., some time in the future), for instance, as described above with reference to step 106 in FIG. 1. In the new image, the fisheye coordinates of the tracked landmark points are transformed to the world space again using the understanding of the camera lens, for instance as part of the functions performed in step 108 of FIG. 1. Step 108 of FIG. 1 may also include the following algorithm for defining transformation. In the world space, landmark points in the reference world space (transformed fisheye reference image coordinates) and new image world space are analyzed in pairs, that is, one landmark point from the reference world space and corresponding tracked point in the new image's world space. Four or more of such pairs define a homography (plane-to-plane transformation) between the two planes. Thus, analyzing the pairs computes the homography or transformation matrix between the reference world space and the new image's world space.

Warping registers or aligns the new image with the reference image. Referring to FIG. 4, the reference fisheye image is scanned to get each pixel's coordinate location, (u, v). Each coordinate location in the reference fisheye image identifies a location to which values are pasted from the new image to create an aligned image. The pasting may be achieved by transforming the reference fisheye pixel coordinate (u, v), to reference image's world space, yielding (x, y), transforming that resultant coordinate to new image's world space, yielding $(\hat{x}, \hat{y})$, and transforming that resultant coordinate to new image's fisheye space yielding (û, v̂) In the new image, the pixel data found closest to coordinate (û, v̂) is copied into location (u, v). This process is repeated for every location (u, v) to produce the aligned image. In one embodiment, the warping step is performed for every image, making the new images appear to have been obtained from the reference camera location.

The system and method of the present disclosure may transform images, for example, acquired using an equidistant projecting fisheye lens with, for example, a 185 degree viewing angle coupled to a 2592×1920 pixel CMOS imaging sensor, for instance, acquired at the rate of 5 frames per second.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed, The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of stabilizing fisheye video imagery, comprising:
    selecting a reference image from a series of fisheye video imagery;
    selecting a plurality of landmark points in the reference image;
    tracking the plurality of landmark points in a new image from the series of fisheye video imagery;
    computing, using a processor, a coordinate system mapping between the new image and the reference image using the tracked landmark points; and
    resampling the new image to align with the reference image.

2. The method of claim 1, wherein the step of computing includes:
    transforming fisheye image coordinates of the reference image to a reference world space coordinates using an understanding of a camera lens;
    transforming the tracked landmark points in the new image to a new image world space coordinates using the understanding of the camera lens; and
    analyzing the plurality of landmark points in the reference world space coordinates and the tracked landmark points in the new image world space coordinates in pairs to define homography between a plane in reference world space and a plane in new image world space, the plurality of landmark points including four or more landmark points.

3. The method of claim 2, wherein the step of computing further includes:
    transforming pixel coordinates in the reference world space to the new image world space using the homography; and
    transforming the transformed pixel coordinates to the fisheye image coordinates of the new image.

4. The method of claim 3, wherein the resampling step includes:
    copying data closest to the transformed pixel coordinates in the fisheye image coordinates of the new image to corresponding reference pixel coordinates in the fisheye image coordinates of the reference image.

5. A method of stabilizing fisheye video imagery, comprising:
    scanning a reference fisheye image to obtain a pixel coordinate location (u, v); selecting a new fisheye image;
    transforming the reference fisheye image coordinate location (u, v) to reference image's world space coordinate (x, y);
    transforming the reference image's world space coordinate (x, y) to new image's world space coordinate ($\hat{x}$, $\hat{y}$);
    transforming the new image's world space coordinates ($\hat{x}$, $\hat{y}$) to new image's fisheye space coordinate ($\hat{u}$, $\hat{v}$); and
    mapping new image data found closest to the new image's fisheye space coordinate ($\hat{u}$, $\hat{v}$) to the reference fisheye image coordinate location (u, v).

6. The method of claim 5, wherein the steps are performed for each pixel in the reference fisheye image and a new fisheye image.

7. The method of claim 5, wherein the step of transforming the reference image's world space coordinate (x, y) to new image's world space coordinate ($\hat{x}$, $\hat{y}$) is performed using homography computed from tracked points in the reference fisheye image and the new fisheye image.

8. The method of claim 7, further including:
    tracking four or more landmark points in the reference fisheye image to the new fisheye image: and
    computing homography that maps the tracked four or more landmark points in the reference fisheye image to the new fisheye image.

9. The method of claim 8, wherein the tracking step is performed using Lucas-Kanade algorithm.

10. The method of claim 8, wherein the tracking step is performed using an optical flow algorithm.

11. The method of claim 5, wherein the step of mapping includes copying new-image data found closest to the new image's fisheye space coordinate ($\hat{u}$, $\hat{v}$) to the reference fisheye image coordinate location (u, v).

12. A system for stabilizing fisheye video imagery, comprising:
    a processor;
    a module operable to execute on the processor and further operable to select a reference image and select a plurality of landmark points in the reference image, the module further operable to track the plurality of landmark points to a new image and compute a coordinate system mapping between the new image and the reference image using the tracked landmark points, the module further operable to resample the new image to align with the reference image.

13. The system of claim 12, wherein the module is operable to compute the coordinate system mapping by:
    transforming fisheye image coordinates of the reference image to a reference world space coordinates using an understanding of a camera lens;
    transforming the tracked landmark points in the new image to a new image world space coordinates using the understanding of the camera lens; and
    analyzing the plurality of landmark points in the reference world space coordinates and the tracked landmark points in the new image world space coordinates in pairs to define homography between a plane in reference world space and a plane in new image world space, the plurality of landmark points including four or more landmark points.

14. The system of claim 13, wherein the module is operable to compute the coordinate system mapping further by:
transforming pixel coordinates in the reference world space to the new image world space using the homography; and
transforming the transformed pixel coordinates to the fisheye image coordinates of the new image.

15. The system of claim 14, wherein the module is operable to resample the new image by:
copying data closest to the transformed pixel coordinates in the fisheye image coordinates of the new image to corresponding reference pixel coordinates in the fisheye image coordinates of the reference image.

16. A system for stabilizing fisheye video imagery, comprising:
a processor;
a module operable to scan a reference fisheye image to obtain a pixel coordinate location (u, v), the module further operable to select a new fisheye image, the module further operable to transform the reference fisheye image coordinate location (u, v) to reference image's world space coordinate (x, y), the module further operable to transform the reference image's world space coordinate (x, y) to new image's world space coordinate ($\hat{x}$, $\hat{y}$), the module further operable to transform the new image's world space coordinates ($\hat{x}$, $\hat{y}$) to new image's fisheye space coordinate ($\hat{u}$, $\hat{v}$) and map data found closest to the new image's fisheye space coordinate ($\hat{u}$, $\hat{v}$) to the reference fisheye image coordinate location (u, v).

17. The system of claim 16, wherein the steps are performed for each pixel in the reference fisheye image and a new fisheye image.

18. The system of claim 16, wherein the module is operable to transform the reference image's world space coordinate (x, y) to new image's world space coordinate ($\hat{x}$, $\hat{y}$) using homography computed from tracked points in the reference fisheye image and the new fisheye image.

19. The system of claim 18, wherein the module is further operable to track four or more landmark points in the reference fisheye image to the new fisheye image; and
compute homography that maps the tracked four or more landmark points in the reference fisheye image to the new fisheye image.

20. The system of claim 16, wherein the module is operable to map by copying data found closest to the new image's fisheye space coordinate ($\hat{u}$, $\hat{v}$) to the reference fisheye image coordinate location (u, v).

21. A non-transitory program storage device readable by a machine, tangibly embodying a program of instructions executable by the machine to perform a method of stabilizing fisheye video imagery, comprising:
selecting a reference image;
selecting a plurality of landmark points in the reference image;
tracking the plurality of landmark points in a new image;
computing a coordinate system mapping between the new image and the reference image using the tracked landmark points; and
resampling the new image to align with the reference image.

22. The program storage device of claim 21, wherein the step of computing includes:
transforming fisheye image coordinates of the reference image to a reference world space coordinates using an understanding of a camera lens;
transforming the tracked landmark points in the new image to a new image world space coordinates using the understanding of the camera lens; and
analyzing the plurality of landmark points in the reference world space coordinates and the tracked landmark points in the new image world space coordinates in pairs to define homography between a plane in reference world space and a plane in new image world space, the plurality of landmark points including four or more landmark points.

23. The program storage device of claim 22, wherein the step of computing further includes:
transforming pixel coordinates in the reference world space to the new image world space using the homography; and
transforming the transformed pixel coordinates to the fisheye image coordinates of the new image.

24. The program storage device of claim 23, wherein the resampling step includes:
copying data closest to the transformed pixel coordinates in the fisheye image coordinates of the new image to corresponding reference pixel coordinates in the fisheye image coordinates of the reference image.

25. A computer readable storage medium storing a program of instructions executable by a machine to perform a method of stabilizing fisheye video imagery, comprising:
scanning a reference fisheye image to obtain a pixel coordinate location (u, v);
selecting a new fisheye image;
transforming the reference fisheye image coordinate location (u, v) to reference image's world space coordinate (x, y);
transforming the reference image's world space coordinate (x, y) to new image's world space coordinate ($\hat{x}$, $\hat{y}$);
transforming the new image's world space coordinates ($\hat{x}$, $\hat{y}$) to new image's fisheye space coordinate ($\hat{u}$, $\hat{v}$); and
mapping new image data found closest to the new image's fisheye space coordinate ($\hat{u}$, $\hat{v}$) to the reference fisheye image coordinate location (u, v).

26. The computer readable storage medium of claim 25, wherein the steps are performed for each pixel in the reference fisheye image and a new fisheye image.

27. The computer readable storage medium of claim 25, wherein the step of transforming the reference image's world space coordinate (x, y) to new image's world space coordinate ($\hat{x}$, $\hat{y}$) is performed using homography computed from tracked points in the reference fisheye image and the new fisheye image.

28. The computer readable storage medium of claim 27, further including:
tracking four or more landmark points in the reference fisheye image to the new fisheye image; and
computing homography that maps the tracked four or more landmark points in the reference fisheye image to the new fisheye image.

29. The computer readable storage medium of claim 28, wherein the tracking step is performed using Lucas-Kanade algorithm.

30. The computer readable storage medium of claim 28, wherein the tracking step is performed using an optical flow algorithm.

31. The computer readable storage medium of claim 25, wherein the step of mapping includes copying new image data found closest to the new image's fisheye space coordinate ($\hat{u}$, $\hat{v}$) to the reference fisheye image coordinate location (u, v).

* * * * *